(12) United States Patent
Hubert et al.

(10) Patent No.: US 11,370,518 B2
(45) Date of Patent: Jun. 28, 2022

(54) DEVICE FOR PROPELLING A NAVIGATIONAL SEACRAFT, AND NAVIGATIONAL SEACRAFT PROVIDED WITH SUCH A DEVICE

(71) Applicant: Mecachrome France, Amboise (FR)

(72) Inventors: Pierre-Julien Hubert, Igny (FR); Romain Jallon, Plaisir (FR)

(73) Assignee: Mecachrome France, Amboise (FR)

( * ) Notice: Subject to any disclaimer, the term of this patent is extended or adjusted under 35 U.S.C. 154(b) by 82 days.

(21) Appl. No.: 16/770,751

(22) PCT Filed: Dec. 5, 2018

(86) PCT No.: PCT/EP2018/083690
§ 371 (c)(1),
(2) Date: Jun. 8, 2020

(87) PCT Pub. No.: WO2019/110685
PCT Pub. Date: Jun. 13, 2019

(65) Prior Publication Data
US 2021/0171174 A1 Jun. 10, 2021

(30) Foreign Application Priority Data
Dec. 8, 2017 (FR) ...................... 1771332

(51) Int. Cl.
*B63H 20/20* (2006.01)
*B63H 23/34* (2006.01)
(Continued)

(52) U.S. Cl.
CPC ............. *B63H 20/20* (2013.01); *B63H 23/34* (2013.01); *B63H 20/22* (2013.01); *B63H 2020/006* (2013.01); *B63H 2021/205* (2013.01)

(58) Field of Classification Search
CPC ........ B63H 20/20; B63H 20/22; B63H 23/34; B63H 2020/006; B63H 2021/205
See application file for complete search history.

(56) References Cited

U.S. PATENT DOCUMENTS

| 3,447,504 A | 6/1969 | Shimanckas |
| 4,279,602 A * | 7/1981 | Alter ...................... B63H 20/36 248/642 |

(Continued)

FOREIGN PATENT DOCUMENTS

| BE | 466601 A | 7/1946 |
| FR | 1234308 A | 10/1960 |

(Continued)

OTHER PUBLICATIONS

Jan. 24, 2019, International Search Report of Application No. PCT/EP2018/083690.

*Primary Examiner* — Stephen P Avila
(74) *Attorney, Agent, or Firm* — Banner & Witcoff, Ltd.

(57) ABSTRACT

The present invention concerns an outboard propulsion device for a navigational seacraft comprising a propulsion means (4), at least one engine (1) supplying torque to a drive shaft (20) extending out of the engine and driving a transmission shaft (3) intended to supply torque to the propulsion means, the drive shaft and the propulsion shaft being in a fixed relative orientation, and a transmission means (2) connected at the input to the drive shaft (20) in order to receive the engine torque and transmit it, in the form of modified torque, to the transmission shaft (3) to which it is connected at the output, and the transmission shaft (3) is a double universal joint shaft (30, 31) that extends in an inclined manner between the transmission means (2) and the propulsion means (4).

10 Claims, 3 Drawing Sheets

(51) Int. Cl.
    *B63H 20/22*     (2006.01)
    *B63H 20/00*     (2006.01)
    *B63H 21/20*     (2006.01)

(56) References Cited

U.S. PATENT DOCUMENTS

| | | |
|---|---|---|
| 4,408,994 A | 10/1983 | Blanchard |
| 8,460,041 B2 * | 6/2013 | Davis .................. B63H 20/285 |
| | | 440/75 |
| 2017/0106958 A1 | 4/2017 | Beachy Head |

FOREIGN PATENT DOCUMENTS

| | | |
|---|---|---|
| JP | S59230894 A | 12/1984 |
| WO | 9703876 A2 | 2/1997 |
| WO | 2004085245 A1 | 10/2004 |

\* cited by examiner

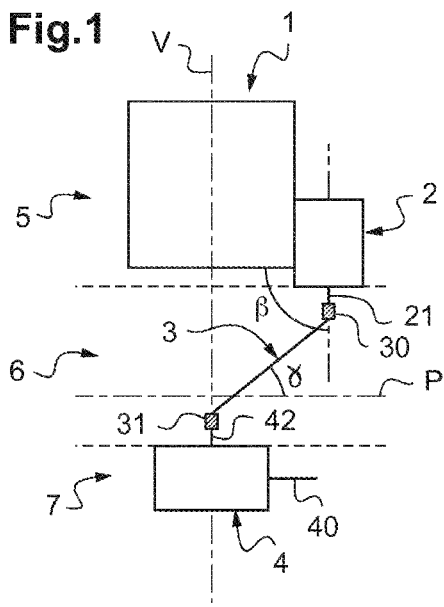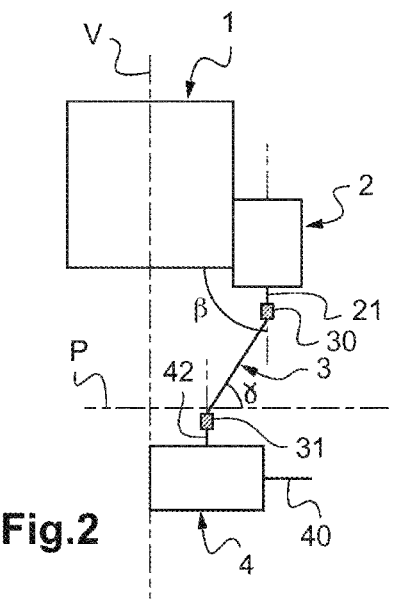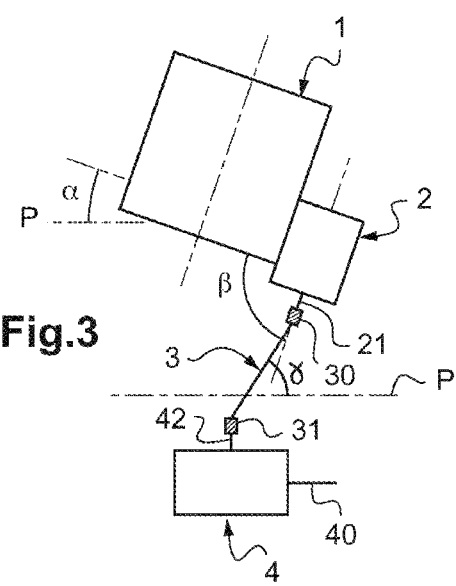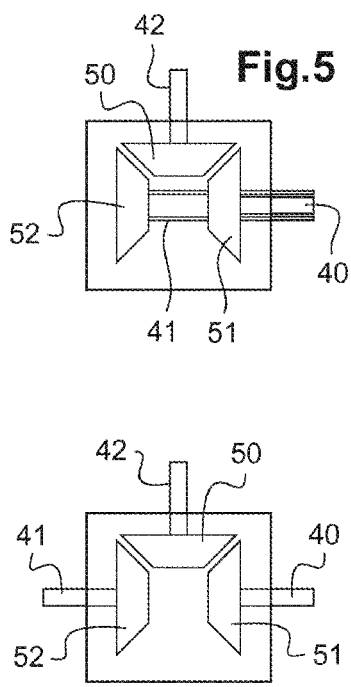

DEVICE FOR PROPELLING A NAVIGATIONAL SEACRAFT, AND NAVIGATIONAL SEACRAFT PROVIDED WITH SUCH A DEVICE

The invention concerns a propulsion device for a sailing seacraft and in particular an outboard propulsion device. It also relates to a sailing craft provided with such a device.

At present many sailing craft are equipped with a propulsion device mounted at the stern of the sailing craft by way of a system enabling rotation of the device about an axis perpendicular to the longitudinal axis of the boat to be able to raise it out of the water.

The invention more particularly concerns outboard propulsion devices, that is to say devices the upper part of which, including an engine, is situated externally of the sailing craft.

A device of this type therefore makes it possible to free up space in the boat in which the engine is normally housed. Moreover, it avoids the presence of rotation means between the shaft of the engine and a shaft for transmitting torque from the engine to a propulsion means of the sailing craft, which simplifies the transfer of a torque from the engine to the propulsion means. Finally, access to the engine is also easier, which simplifies maintenance operations.

Vertical shaft engines exist. However, in the context of the invention it is wished to use engines from the automotive industry and not developed specifically for marine applications. This makes it possible to benefit from the technologies proven for automotive engines, at lower cost given their mass production.

These engines, whether of diesel or gasoline type, include a drive shaft oriented horizontally and so means are provided for transmitting a torque between the horizontal drive shaft and the also horizontal shaft of the propulsion means.

Some of these outboard propulsion devices have the particular feature of using a vertical transmission shaft. By vertical shaft is meant a shaft that extends globally perpendicularly to an axis of propulsion of the craft, that is to say perpendicularly to the direction of movement of the sailing seacraft.

Thus the document FR 2 939 403 describes a device of this type in which transmission of torque between the drive shaft and the transmission shaft, which are mutually perpendicular, is effected by means of shafts parallel to the drive shaft and a plurality of gears. These shafts make it possible to move the transmission shaft to under the engine. This makes the propeller closer to the boat, reduces the drag force and also renders the device more compact.

However, this device has the disadvantage of being of relatively complex construction because of the presence of a plurality of supplementary shafts and numerous gears.

There may also be cited the document U.S. Pat. No. 8,460,041 that describes a propulsion device of the same type with an engine external to the sailing craft and the axis of which is parallel to that of the propulsion means. Transmission of torque between the drive shaft and the vertical transmission shaft is effected thanks to two drive means, the first between the drive shaft and an intermediate shaft situated substantially under the engine and parallel to the drive shaft and the second between that intermediate shaft and the vertical transmission shaft.

By drive means is meant a means for transmitting a torque from one shaft to a subsequent, adjacent shaft, such as for example a transmission belt or two gears meshing with one another.

The construction of this device remains relatively complex because of the presence of an intermediate shaft, a transmission belt with associated pulleys, and gears.

There may further be cited the document US 2014/0179179 which again concerns a propulsion device with an engine external to the sailing craft and the axis of which is parallel to that of the propulsion means.

In contrast to the other devices, this device does not include a vertical transmission shaft. Moreover, transmission of torque between the drive shaft and the shaft of the propulsion means is made by means of two horizontal intermediate shafts and belts.

This device has the advantage of being compact but necessitates the presence of intermediate shafts and belts, which renders its construction complex. Moreover, the belts have a limited lifetime, which complicates maintenance of the device.

An object of the invention is to alleviate the disadvantages of the known devices by proposing an outboard propulsion device for a sailing craft, that is to say one including an engine situated externally of the sailing craft to drive a propulsion means, the construction of which is simplified by reducing the number of moving parts of the shaft, gear, belt or chain type and the weight and the cost of which are consequently lower, the device being compact, robust and simple to maintain.

Thus the invention concerns an outboard propulsion device for a sailing seacraft including a propulsion means, at least one engine supplying a torque to a drive shaft extending outside the engine and driving a transmission shaft intended to supply a torque to the propulsion means, the drive shaft and the propeller shaft being in a fixed relative orientation, and a transmission means connected at the input to the drive shaft and at the output to the transmission shaft, characterized in that said transmission means modifies the orientation of the drive torque and transmits it in the form of a modified torque to the transmission shaft and in that the transmission shaft is a double joint shaft that extends in an inclined manner between the transmission means and the propulsion means, said transmission shaft transmitting at least in part said modified torque to the propulsion means.

In advantageous embodiments, one and/or the other of the following features are moreover used:
  the propulsion means is situated at least in part under the engine;
  the angle between the propeller shaft and the transmission shaft is between 45° and 90° inclusive;
  the drive shaft extends downstream of the engine whereas the transmission shaft extends from the downstream side of the engine in the direction of the upstream side of the engine;
  the output of the transmission means is located below the level of the engine;
  the drive shaft and the propeller shaft form between them an angle between 0° and 45° inclusive;
  the change of orientation between the drive torque and the modified torque is approximately 90°;
  a means for alternate selection of forward propulsion, reverse propulsion and a neutral position and/or a speed reduction means are integrated into the transmission means;
  the propulsion means includes two contrarotating propellers;
  the joints of the double-joint shaft are homokinetic joints;
  the joints of the double-joint shaft are universal joints;
  the device includes an internal combustion engine and an electric motor.

The invention also concerns a sailing craft equipped with a propulsion device according to the invention.

The invention will be better understood and other aims, advantages and features thereof will become more clearly apparent on reading the following description with reference to the appended drawings, in which:

FIG. 1 is a schematic illustration of one example of a propulsion device according to the invention.

FIG. 2 is a schematic view of a variant embodiment of the propulsion device according to the invention.

FIG. 3 is a schematic view showing another variant embodiment of the propulsion device according to the invention.

FIGS. 5 and 6 are schematic views showing examples of contrarotating propellers.

Figure 4:
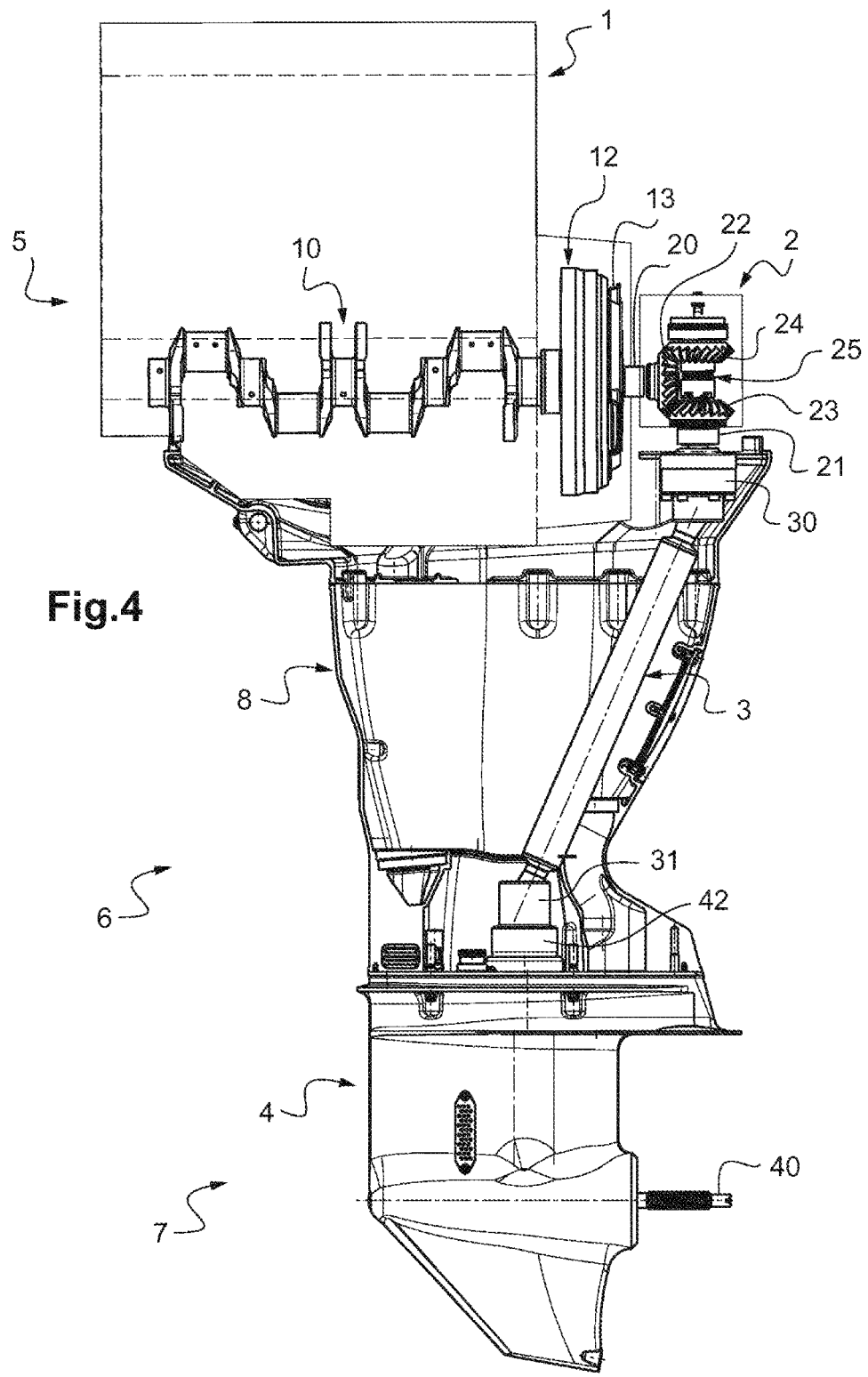
FIG. 4 is a part-sectional view showing one embodiment of the propulsion device according to the invention.
Figure 7:
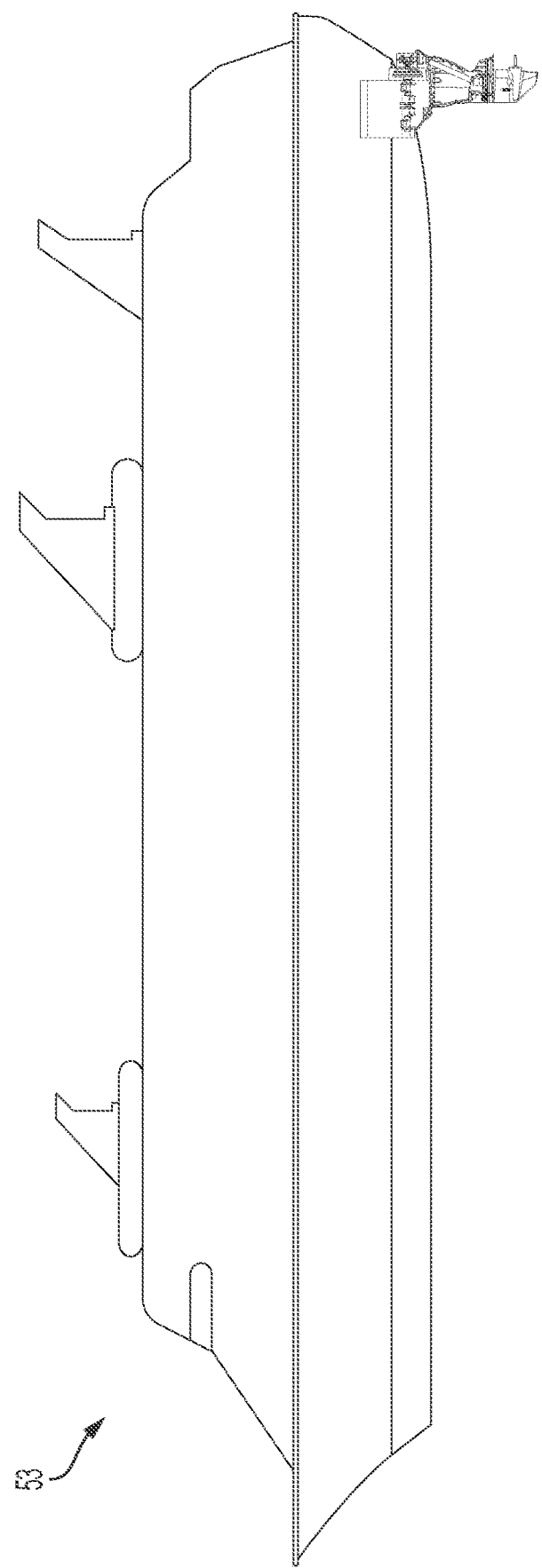
FIG. 7 shows a seacraft 53 incorporating a propulsion means of the type indicated in the other figures.

Elements common to the various figures will be designated by the same references.

Throughout the application, by "downstream of" or "to the rear of" is to be understood as meaning situated on the side opposite the stern of the sailing craft when the propulsion device is fixed to the sailing craft and by "upstream of" or "in front of" is to be understood as meaning on the side of the stern of the sailing craft.

Referring first of all to FIG. 1, the propulsion device according to the invention includes a top part 5 comprising an engine 1 and a means 2 for transmitting the torque from the engine, an intermediate part 6 comprising a transmission shaft 3, and a bottom part 7 comprising the propulsion means 4.

These three parts are disposed in a casing (not represented) that delimits an internal housing for the various means constituting the propulsion device.

It is understood that the propulsion device is represented in a vertical position of use, along a vertical axis V of that device.

This device is intended to be fixed to the stern of a sailing seacraft by means of articulation means that are not represented in FIG. 1. Those articulation means conventionally enable raising of the propulsion device above the level of the water.

We will now concentrate on the various elements constituting the propulsion device according to the invention.

Here the engine 1 is an internal combustion engine and thus conventionally includes a plurality of cylinders housed in a cylinder block and each delimiting a combustion chamber. In each cylinder moves a piston mobile by way of a connecting rod connecting the mobile piston to a crankshaft (these various elements are conventional and are not represented in FIG. 1).

The crankshaft drives a drive shaft 20 (see FIG. 4) that is situated on the axis of the crankshaft. In the example shown in FIG. 1 the crankshaft and the drive shaft are substantially parallel to the propulsion axis P of the device.

However, the invention is not limited to this embodiment and the device could also include an electric motor as well as an internal combustion engine to obtain a hybrid propulsion device. This electric motor could be located above the transmission means 2, which would then include an input to receive torque from this electric motor, the axis of the electric motor then being substantially perpendicular to the drive shaft 20.

The drive shaft is therefore external to the engine and is connected at one end to the output of the crankshaft and at the other end to the input of the transmission means 2.

In the example shown in FIG. 1 the drive shaft 20 extends downstream of the engine, that is to say on the opposite side to the stern of the sailing craft, when the device is fixed to the latter, or again opposite the means articulating the device on the stern of the sailing craft.

The transmission means 2 that is situated in line with and downstream of the drive shaft is therefore also positioned downstream of the engine (and not under the engine).

The function of the transmission means 2 is to transmit the drive torque supplied by the drive shaft to the transmission shaft 3.

That transmission shaft includes at each of its ends a joint 30, 31, a first joint 30 being connected to the output 21 of the transmission means 2 whereas the second joint 31 is connected to the input 42 of the propulsion means 4. The input 42 and the output 21 consist of shafts. The shaft 21 may also be considered as part of the joint 30 and the input shaft 42 as part of the joint 31.

By joint is to be understood here a ball-joint articulation.

Generally speaking, these joints are designed to couple two non-aligned rotating shafts.

The two joints are preferably homokinetic joints and/or universal joints.

As shown in FIG. 1, this shaft 3 extends in an inclined manner between the transmission means 2 and the propulsion means 4. This inclination between the transmission means 2 and the propulsion means 4 is in the upstream direction, or again toward the stern of the sailing craft when the propulsion device is in use.

This makes it possible to place the propulsion means at least in part under the engine 1 along the axis V and therefore to favor the compactness of the propulsion device.

In the example shown in FIG. 1 the angle γ between the propulsion axis P or the propeller shaft 40 and the transmission shaft 3 is approximately 45°.

The invention is not limited to this example and this angle γ may be between 45° and 90° inclusive and in particular between 70° and 90° inclusive or again approximately 80°.

It should be noted that this angle γ is preferably greater than 45° when the joints used are universal joints.

The transmission means 2 is designed to modify the orientation of the drive torque (here about a substantially horizontal axis) to transmit it to the first universal joint 30.

In the example shown in FIG. 1 this modification of the orientation between the drive torque and the transmitted modified torque at the level of the first universal joint (indicated by the angle β) is approximately 90°.

However, the invention is not limited to such a change of orientation. In practise the angle β must be at least 70° to enable transmission of the drive torque to the universal joint 30.

The propulsion means 4 include a drive means so that the modified torque that drives the transmission shaft 3 is transmitted at least in part to the propeller shaft 40.

Those drive means will be described in more detail with reference to FIGS. 5 and 6.

FIG. 1 shows that in this embodiment the propeller shaft 40 extends toward the rear of the propulsion device, that is to say on the side opposite the stern of the sailing craft, when the propulsion device is in use.

This propeller shaft is conventionally fitted with a propeller (not represented in the figure) also disposed at the rear of the propulsion means 4.

In the example shown in FIG. 1 the axis of the crankshaft or of the drive shaft and the propulsion axis are substantially parallel, both being substantially horizontal or again parallel to the propulsion axis P.

In an outboard propulsion device the angle between the drive shaft and the propeller shaft is generally fixed but not necessarily zero.

Refer now to FIG. 2, which shows that the inclination of the transmission shaft 3 may vary in embodiments of the propulsion device.

FIG. 2 shows another example of a propulsion device according to the invention that has the same general features as that shown in FIG. 1.

In particular, the axes of the crankshaft, of the drive shaft and of the propeller shaft are again substantially parallel to the propulsion axis P and the transmission means 2 is downstream of the engine 1.

On the other hand, the relative disposition of the engine 1 and of the propulsion means 4 along the vertical axis V of the device has been modified.

In actual fact, in FIG. 1, the propulsion means 4 is situated entirely under the engine, the engine and the propulsion means being substantially aligned relative to the vertical axis V.

In the embodiment from FIG. 2 the propulsion means 4 is only in part under the engine because it is shifted toward the rear relative to that vertical axis.

This makes it possible to increase the angle γ between the propeller shaft and the transmission shaft 3, which relieves the stresses on the two universal joints 30 and 31.

Another variant embodiment of the propulsion device according to the invention is shown in FIG. 3.

The propulsion device again includes the same constituent means, this variant consisting in inclining the crankshaft of the engine 1 and therefore the drive shaft relative to the propulsion axis (or the propeller shaft 40) which, for its part, remains horizontal.

This orientation is characterized by the angle α between the propulsion axis P and the direction of the drive shaft.

This angle α is greater than 0° and may be up to 45°. However, it is preferably between 0 and 20° inclusive.

Compared to the embodiment shown in FIG. 1, this inclination of the engine makes it possible to reduce the operating angle 90°-α-γ of the first universal joint 30 and, to a lesser degree, the operating angle 90°-γ of the second universal joint 31. This enables the joints to operate under improved conditions, which increases their service life.

This inclination also makes it possible to improve the balance of the engine by shifting the center of gravity toward the boat and the propulsion means.

In all the embodiments shown in FIGS. 1 to 3 it is seen that the use of an inclined double-joint shaft enables space to be freed up between the engine 1 and the propulsion means 4, which space may be used for example to house antipollution systems or marine adaptation devices (water pumps, heat exchangers).

Moreover, this shaft is of simplified construction compared to the drive means conventionally used in known devices that include supplementary shafts, transmission belts or gears.

In actual fact this is a component conventionally used in the automotive industry and the cost of which is relatively low.

Finally, this inclined transmission shaft enables the propulsion means and therefore the propeller to be moved closer to the stern of the sailing craft, which enables the device to be made compact whilst reducing the drag force.

It may further be emphasized that the use of a double-joint shaft enables operation of the device to be assured despite any defective alignment in three dimensions of the drive shaft and of the propeller shaft occurring during the construction or the use of the device, which improves the reliability of the device by simplifying its design and manufacturing tolerances.

It should be emphasized that in all the embodiments the crankshaft (or the drive shaft) and the propeller shaft are in a fixed relative position, no movement occurring between them.

Refer now to FIG. 4 which shows in more detail the implementation of the transmission means 2.

This figure shows the main constituent elements of the top part 5 of the device. It schematically represents the casing 8 in which the various parts of the device are housed, that casing being partly cut away at the level of the top part 5 and of the intermediate part 6.

Thus this figure shows the crankshaft 10 of the engine 1 that drives the drive shaft 20.

In the embodiment shown in FIG. 4 a damper flywheel 12 and a clutch 13 are provided between the crankshaft 10 and the transmission means 2.

Here the latter includes a first bevel gear 22 connected directly to the input shaft 20 or in direct interengagement with that shaft 20 and a second bevel gear 23 and a third bevel gear 24 situated at 90° to the first gear.

The second and third bevel gears 23 and 24 turn in opposite directions and are activated by means of a dog clutch 25 that enables selective connection thereof to the output shaft 21 of the transmission means.

The dog clutch may also assume a neutral position in which no torque is transmitted to the shaft 21.

Thus in this embodiment the transmission means includes a means for alternate selection of forward propulsion, reverse propulsion and a neutral position.

The gears may also be designed to effect a reduction of speed. In this case, the speed reduction means is also provided in the transmission means.

In practise the transmission means 2 includes only gears and no intermediate shaft. It is therefore of simple and compact design.

The device generally has no intermediate shaft parallel to the crankshaft or to the drive shaft.

As shown in FIG. 1 for example, the output shaft 21 of the transmission means 2 is connected to the first joint 30 which is itself connected to the transmission shaft 3 which extends in an inclined manner and toward the front of the engine as far as the second joint 31. The latter is connected at the output by the shaft 42 to the propulsion means 4 that drives the propeller shaft 40.

Moreover, in the example shown in FIGS. 1 to 3, the output shaft 21 of the transmission means is situated at a level lower than that of the engine 1 whereas in the example shown in FIG. 4 it is situated at a level lower than that of the crankshaft 10. In both cases it is considered to be situated below the level of the engine.

In the prior art the speed reduction and reverse mechanisms are generally provided in the propulsion means.

In the embodiment of the propulsion means shown in FIG. 4 these mechanisms are included in the transmission means.

This makes it possible to reduce the overall size of the propulsion means in order to reduce its diameter and thus the drag force. This also makes it possible to integrate into the propulsion means a mechanism for driving contrarotating propellers.

Thus FIGS. 5 and 6 describe two embodiments of the propulsion means 4 that essentially includes a means for driving two contrarotating shafts, the propulsion means including two contrarotating propellers.

The invention is of course not limited to such drive means and the latter could include only one propeller.

In the example shown in FIG. 5, the second joint 31 connects the transmission shaft 3 to the input shaft 42 of the propulsion means 4.

The latter drives a first bevel gear 50 that drives two bevel gears 51 and 52 in opposite directions.

The first bevel gear 51 drives the propeller shaft 40 in a first direction whereas the second bevel gear 52 drives a second propeller shaft 41 in the opposite direction.

Each of the propeller shafts 40 and 41 drives a propeller in rotation, that on the shaft 40 rotating and that on the shaft 41 contrarotating or vice versa.

In this embodiment, the two propeller shafts 40 and 41 both extend on the downstream side of the propulsion device, that is to say, in the example shown in FIGS. 1 and 3, on the same side as the transmission means 2.

The embodiment shown in FIG. 6 differs from the previous one in that the propeller shaft 40 again extends toward the rear, as in the embodiments shown in FIGS. 1 to 3. However, the contrarotating propeller shaft 41 for its part extends toward the upstream side of the propulsion device, that is to say toward the stern of the sailing craft.

The invention is not limited to this embodiment and in particular the rotating and contrarotating shafts 40 and 41 could also extend toward the upstream side of the propulsion device, that is to say toward the stern of the sailing craft when the device is in use.

In the embodiment shown in FIGS. 1 to 4, the transmission means is situated toward the rear or downstream of the engine 1 and the transmission shaft is inclined from the transmission means toward the propulsion means toward the front of the device or again in the direction of the stern of the sailing craft when the propulsion device is operating.

However, the invention is not limited to this embodiment and the transmission means 2 could be positioned on the upstream side of the engine 1. In this case, the transmission shaft is again inclined from the transmission means toward the propulsion means but this time away from the stern of the sailing craft. This still enables a compact device of simplified construction to be obtained.

Moreover, in all the examples described, the input shaft 42 of the propulsion means 4 is substantially perpendicular to the propeller shaft 40 or to the propulsion axis P.

It will be noted that the output shaft 21 and the input shaft 42 are not necessarily parallel (see FIG. 3).

Some elements of the propulsion device require lubricating oil. This is why the device includes an oil reservoir and an oil pump to recover and to store the lubricating oil and to inject it into those elements, such as for example the bevel gears of the transmission means.

This oil reservoir is preferably accommodated in the bottom part 7 of the propulsion device that, in use, is below the average water line of the sailing craft. In actual fact, that average water line is generally situated in the intermediate part 6 of the propulsion device. Because of this, the oil reservoir is cooled by the temperature of the water, which is generally lower than that of the lubricating oil.

This oil reservoir is preferably common to the transmission means and to the propulsion means.

As goes without saying and as also follows from the foregoing description, the present invention is not limited to the embodiments more particularly described. To the contrary it encompasses all variants thereof and in particular those in which different mechanisms are integrated into the transmission means and where the propulsion means is not situated at least in part under the engine but offset toward the upstream side or toward the downstream side of the engine.

The invention claimed is:

1. An outboard propulsion device for a seacraft including a propulsion means (4) that drives a propeller shaft (40), at least one engine (1) supplying a torque to a drive shaft (20) extending outside the engine and driving a transmission shaft (3) intended to supply a torque to the propulsion means, the drive shaft and the propeller shaft being in a fixed relative orientation, the drive shaft (20) and the propeller shaft (40) forming between them an angle between 0° and 45° inclusive, and a transmission means (2) connected at the input to the drive shaft (20) and at the output to the transmission shaft, characterized in that said transmission means (2) modifies the orientation of the drive torque and transmits it in the form of a modified torque to the transmission shaft (3), in that the drive shaft (20) extends downstream of the engine and in that the transmission shaft (3) is a double joint (30, 31) shaft that extends in an inclined manner between the transmission means (2) and the propulsion means (4), from the downstream side of the engine in the direction of the upstream side of the engine, said transmission shaft transmitting at least in part said modified torque to the propulsion means.

2. The device as claimed in claim 1, characterized in that the propulsion means (4) is situated at least in part under the engine (1).

3. The device as claimed in claim 1, characterized in that the angle γ between the propeller shaft (40) and the transmission shaft (3) is between 45° and 90° inclusive.

4. The device as claimed in claim 1, characterized in that the output of the transmission means is located below the level of the engine.

5. The device as claimed in claim 1, characterized in that the change of orientation between the drive torque and the modified torque is approximately 90°.

6. The device as claimed in claim 1, characterized in that a means for alternate selection of forward propulsion, reverse propulsion and a neutral position and/or a speed reduction means (23) are integrated into the transmission means.

7. The device as claimed in claim 1, characterized in that the propulsion means (4) includes two contrarotating propellers.

8. The device as claimed in claim 1, characterized in that the joints (30, 31) of the double joint shaft are homokinetic joints and/or universal joints.

9. The device as claimed in claim 1, characterized in that said engine (1) is an internal combustion engine, the device also including an electric motor connected to the transmission means (2) by a shaft substantially perpendicular to the drive shaft (20).

10. A seacraft equipped with a propulsion device as claimed in claim 1.

* * * * *